US012455523B2

(12) United States Patent
Souma et al.

(10) Patent No.: US 12,455,523 B2
(45) Date of Patent: Oct. 28, 2025

(54) FIXING ROTATING MEMBER, FIXING DEVICE, ELECTROPHOTOGRAPHIC IMAGE FORMING APPARATUS, AND METHOD FOR MANUFACTURING FIXING ROTATING MEMBER

(71) Applicant: CANON KABUSHIKI KAISHA, Tokyo (JP)

(72) Inventors: Makoto Souma, Kanagawa (JP); Matsutaka Maeda, Kanagawa (JP); Akira Okano, Kanagawa (JP); Naoko Kasai, Kanagawa (JP); Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/490,924

(22) Filed: Oct. 20, 2023

(65) Prior Publication Data

US 2024/0168420 A1 May 23, 2024

(30) Foreign Application Priority Data

Oct. 26, 2022 (JP) ................................ 2022-171565

(51) Int. Cl.
*G03G 15/20* (2006.01)
*H05B 6/38* (2006.01)

(52) U.S. Cl.
CPC .......... *G03G 15/2057* (2013.01); *H05B 6/38* (2013.01); *H05B 2206/022* (2013.01)

(58) Field of Classification Search
CPC . G03G 15/2057; H05B 6/38; H05B 2206/022
See application file for complete search history.

(56) References Cited

U.S. PATENT DOCUMENTS

| | | | | |
|---|---|---|---|---|
| 6,223,017 | B1 | 4/2001 | Akutsu et al. | |
| 8,019,266 | B2 | 9/2011 | Baba et al. | |
| 8,550,877 | B2 | 10/2013 | Hiroshi et al. | |
| 9,563,159 | B2 * | 2/2017 | Jota .................... | G03G 15/2053 |
| 10,012,935 | B2 | 7/2018 | Nishizawa et al. | |
| 10,216,130 | B2 | 2/2019 | Imaizumi et al. | |

(Continued)

FOREIGN PATENT DOCUMENTS

| | | |
|---|---|---|
| EP | 3 835 060 A1 | 6/2021 |
| JP | 10-165311 A | 6/1998 |

(Continued)

OTHER PUBLICATIONS

Maeda et al., U.S. Appl. No. 18/490,933, filed Oct. 20, 2023.

(Continued)

*Primary Examiner* — Sevan A Aydin
(74) *Attorney, Agent, or Firm* — Venable LLP

(57) ABSTRACT

A fixing rotating member comprising: a base material and an electro-conductive layer on the base material; the electro-conductive layer extending in a circumferential direction of an outer peripheral surface of the base material, the electro-conductive layer comprising silver, an average crystal grain size of crystals of the silver observed in a cross section along a circumferential direction of the electro-conductive layer being 20 to 200 nm, and the electro-conductive layer having a volume resistivity of $1.0\times10^{-8}$ to $8.0\times10^{-8}$ $\Omega\cdot$m.

9 Claims, 7 Drawing Sheets

(56) References Cited

U.S. PATENT DOCUMENTS

| | | | | |
|---|---|---|---|---|
| 10,452,012 | B2 | 10/2019 | Usui et al. | |
| 10,802,433 | B1 | 10/2020 | Watanabe et al. | |
| 11,644,777 | B2 | 5/2023 | Ishifuji et al. | |
| 2006/0204295 | A1 | 9/2006 | Takagi et al. | |
| 2008/0124111 | A1* | 5/2008 | Baba | G03G 15/2039 399/69 |
| 2008/0124147 | A1* | 5/2008 | Uehara | G03G 15/2039 399/329 |
| 2011/0150545 | A1* | 6/2011 | Nihonyanagi | G03G 15/2064 399/329 |
| 2016/0026127 | A1* | 1/2016 | Hayasaki | G03G 15/2053 399/69 |
| 2017/0160682 | A1 | 6/2017 | Nishizawa et al. | |
| 2018/0173140 | A1* | 6/2018 | Imaizumi | G03G 15/2057 |
| 2019/0033758 | A1* | 1/2019 | Uehashi | G03G 15/206 |
| 2019/0171145 | A1* | 6/2019 | Imaizumi | G03G 15/2057 |
| 2022/0394821 | A1* | 12/2022 | Tong | H05B 3/14 |
| 2024/0160135 | A1* | 5/2024 | Maeda | G03G 15/2057 |
| 2024/0160136 | A1* | 5/2024 | Okano | H05B 6/145 |

FOREIGN PATENT DOCUMENTS

| | | | |
|---|---|---|---|
| JP | 2005-202272 | A | 7/2005 |
| JP | 2006-10884 | A | 1/2006 |
| JP | 2008-152247 | A | 7/2008 |
| JP | 2012-68513 | A | 4/2012 |
| JP | 2013-228708 | A | 11/2013 |
| JP | 2018-133157 | A | 8/2018 |
| JP | 2020-105551 | A | 7/2020 |
| JP | 2021-51136 | A | 4/2021 |
| WO | 2016/208153 | A1 | 12/2016 |

OTHER PUBLICATIONS

Okano et al., U.S. Appl. No. 18/490,973, filed Oct. 20, 2023.
Nobuyuki Otsu, "A Threshold Selection Method from Gray-Level Histograms," SMC-9(1) IEEE Trans. Syst. Man Cybern. 62-66 (Jan. 1979).
Non-final Office Action in U.S. Appl. No. 18/490,933 (Sep. 2024).
Non-final Office Action in U.S. Appl. No. 18/490,973 (Sep. 2024).
Final Office Action in U.S. Appl. No. 18/490,933 (Apr. 2025).
Notice of Allownce in U.S. Appl. No. 18/490,973 (Apr. 2025).
Notice of Allowance in U.S. Appl. No. 18/490,933 (Aug. 2025).

* cited by examiner

FIXING ROTATING MEMBER, FIXING DEVICE, ELECTROPHOTOGRAPHIC IMAGE FORMING APPARATUS, AND METHOD FOR MANUFACTURING FIXING ROTATING MEMBER

BACKGROUND

Technical Field

The present disclosure relates to a fixing rotating member that is suitable for a fixing device of an electrophotographic image forming apparatus such as an electrophotographic copier or printer, a fixing device, an electrophotographic image forming apparatus, and a method for manufacturing the fixing rotating member.

Description of the Related Art

A fixing device installed in an electrophotographic image forming apparatus such as an electrophotographic copier or printer typically fixes an unfixed toner image on a recording material by heating while transporting the recording material that bears the image at a nip portion formed by a heated fixing rotating member and a pressure roller in contact therewith.

An electromagnetic induction heating type fixing device including a fixing rotating member provided with an electro-conductive layer, the device being able to cause the electro-conductive layer to directly generate heat, has been developed and put into practical use. The electromagnetic induction heating type fixing device has the advantage of a short warm-up time.

The electro-conductive layer is required to have conductivity and durability against repeated strain under heating.

In order to suppress cracking of the electro-conductive layer at a bent portion where repeated strain occurs, Japanese Patent Application Publication No. 2021-051136 discloses a fixing member in which the average crystal grain size of an electro-conductive layer containing copper is from 0.1 μm to 3.10 μm.

Japanese Patent Application Publication No. 2020-105551 discloses a terminal material in which a silver plating layer containing antimony is formed on a base material made of copper or a copper alloy. In this terminal material, the silver plating layer has an antimony content of from 0.1% by mass to 1.5% by mass.

SUMMARY

At least one aspect of the present disclosure is directed to providing a fixing rotating member that has high conductivity and excellent durability, and to a manufacturing method thereof. Further, at least one aspect of the present disclosure is directed to providing a fixing device using the fixing rotating member. Still further, at least one aspect of the present disclosure is directed to providing an electrophotographic image forming apparatus using the fixing device.

According to at least one aspect of the present disclosure, there is provided a fixing rotating member comprising:

a base material and an electro-conductive layer on the base material;

the electro-conductive layer extending in a circumferential direction of an outer peripheral surface of the base material, the electro-conductive layer comprising silver, an average crystal grain size of crystals of the silver observed in a cross section along a circumferential direction of the electro-conductive layer being 20 to 200 nm, and the electro-conductive layer having a volume resistivity of $1.0\times10^{-8}$ to $8.0\times10^{-8}$ Ω·m.

According to at least one aspect of the present disclosure, there is provided a fixing device comprising:

the above fixing rotating member, and an induction heating device that causes the fixing rotating member to generate heat by induction heating.

According to at least one aspect of the present disclosure, there is provided an electrophotographic image forming apparatus, the electrophotographic image forming apparatus comprising:

an image bearing member that bears a toner image;

a transfer device that transfers the toner image onto a recording material; and a fixing device that fixes the transferred toner image onto the recording material; wherein the fixing device is the above fixing device.

According to at least one aspect of the present disclosure, there is provided a method for manufacturing the above fixing rotating member, comprising:

(i) obtaining the base material, and (ii) applying a silver nanoparticle ink to the outer peripheral surface of the base material and baking to obtain the electro-conductive layer.

Further features of the present disclosure will become apparent from the following description of exemplary embodiments with reference to the attached drawings.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. In the present disclosure, wording such as "at least one selected from the group consisting of XX, YY and ZZ" means any of:

XX; YY; ZZ; a combination of XX and YY; a combination of XX and ZZ; a combination of YY and ZZ; or a combination of XX and YY and ZZ.

In recent years, the speed of printers has increased, and there is a demand for further improvements in durability of the electro-conductive layer. Copper, which is commonly used in conductive layers, is easily oxidized, and there is a concern that conductivity thereof will decrease with long-term use. Therefore, it is desirable to use silver which is unlikely to oxidize and also has high conductivity. However, where the electro-conductive layer is formed by silver plating, the crystal grain size is large and the tensile strength is weak, resulting in poor durability.

Meanwhile, where at attempt is made to maintain a small crystal grain size of the electro-conductive layer formed by silver plating, it is necessary to add an additive such as antimony, as in Japanese Patent Application Publication No. 2020-105551, so the conductivity decreases and the amount of generated heat required by the fixing device cannot be obtained.

The fixing rotating member is affected by repeated strains at the nip portion under heating, and long-term durability thereof is required. One of the fracture modes that affect durability is breakage of the electro-conductive layer. This is because of the stress applied to the electro-conductive layer containing silver, tensile stress is generated along the direction of rotation, and cracks occur at the interface of silver crystals forming the electro-conductive layer. Starting there, the electro-conductive layer is broken, and the conductivity is impaired.

Figure 1A:
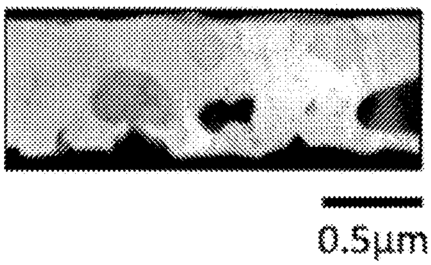
FIG. 1A is a cross-sectional SEM observation image of an electro-conductive layer (photograph substituting for drawing).

In the course of investigation, the present inventors have found that a large number of stable crystal interfaces are formed when the average crystal grain size of silver contained in the electro-conductive layer is within a specific range, so that the occurrence of cracks at the crystal interfaces is suppressed and the durability is improved (see FIG. 1A).

The reason for this is conceivably that when the average crystal grain size is within a specific range, more crystal interfaces are formed than when the average crystal grain size is larger than the range. It is presumed that, as a result, the tensile stress is dispersed without concentrating on a specific crystal interface, thereby suppressing the occurrence of cracks at the crystal interface.

In addition, the crystal structure of a single crystal is considered to be more stable than when the average crystal grain size is smaller than a specific range. Therefore, it is presumed that stable crystal interfaces are formed, and cracks are less likely to occur at the crystal interfaces due to tensile stress.

Specifically, the average crystal grain size of silver crystals observed in a cross section along the circumferential direction of the electro-conductive layer is from 20 nm to 200 nm. Here, the average crystal grain size of silver crystals contained in the electro-conductive layer is obtained as follows.

First, a sample for evaluation is prepared. Six samples each having a length of 5 mm, a width of 5 mm, and a thickness equal to the total thickness of the fixing rotating member are taken from arbitrary positions of the fixing rotating member. For the obtained six samples, the cross section in the circumferential direction of the fixing rotating member is processed by polishing using an ion beam. At this time, the processing position is adjusted so that the cross section in the circumferential direction of the electro-conductive layer is exposed by polishing with the ion beam.

A cross-section polisher (trade name: JSM-F100, SM09010 manufactured by JEOL Ltd.) is used for polishing the cross section with an ion beam. Polishing the cross section with an ion beam can prevent a filler from falling off from the sample and an abrasive from entering the sample, and can form a cross section with few polishing marks.

Subsequently, the cross section of the electro-conductive layer is observed with a scanning electron microscope (SEM) (trade name: JSM-F100, manufactured by JEOL Ltd.) to obtain a cross-sectional image (FIG. 1A). Observation conditions are a backscattered electron image mode at a magnification of 20,000, and backscattered electron image acquisition conditions are an accelerating voltage of 3.0 kV and a working distance of 3 mm.

Next, the obtained image is binarized using commercially available image software, which will be described hereinbelow, so that the crystal grain portion is white and the portion other than the crystal grains is black. As a method of binarization, the Otsu method can be used.

Figure 1B:
FIG. 1B is a binary image obtained from the SEM observation image.

Then, from the contrast difference due to the difference in brightness or difference in crystal orientation between the crystal grains in the cross-sectional image in FIG. 1A, lines separating the crystal grains are added to the binary image obtained, and the binary image with separated crystal grains is acquired (FIG. 1B).

Specifically, first, a backscattered electron image is read with an image analysis software Image-Pro Plus manufactured by Media Cybernetics, Inc. and brightness distribution of the image is obtained. Then, by setting the brightness range of the obtained brightness distribution, it is possible to perform binarization that distinguishes between the crystal grains and portions other than the crystal grains. The specific binarization procedure is as follows.

The backscattered electron image is read with Image-Pro Plus, and image processing such as bandpass filtering or high-Gauss filtering is performed from a 2D filter in the "Processing" tab so that the interfaces between the crystal grains and portions other than the crystal grains and between the crystal grains become clear. Then "Manual" is selected from object extraction methods in a "Count/Size tab". After that, the brightness distribution of the read image is displayed in a binarization tool window, so the brightness range corresponding to the crystal grains in the image is designated. As a result, binarization can be performed for the crystal grains and portions other than the crystal grains.

After that, interfaces that separate the crystal grains are set using a division tool, thereby making it possible to acquire a binary image in which the silver crystal grains are separated, as shown in FIG. 1B. A specific interface setting procedure is as follows. A manual division tool is selected in the "Count/size tab" for the binary image in Image-Pro Plus to divide the crystal grains along the crystal interfaces.

The blackened portions in FIG. 1B are the gaps included in the electro-conductive layer or the materials of the layers other than the electro-conductive layer, such as polyimides and polyamideimides, which are base materials.

A method for calculating the average crystal grain size from the binary image of the cross section of the electro-conductive layer thus obtained will be described hereinbelow. Since digital image processing technology is applied to these images, it is assumed that all images are in a general digital image format in which pixels are arranged in a grid pattern. Further, the binary images are grayscale images containing only brightness information, and images obtained by performing image processing on these images thereafter are all grayscale images of the same format unless otherwise specified.

First, the circle-equivalent diameter of each crystal grain is calculated. The circle-equivalent diameter of each crystal grain means the diameter of a circle having the same area as that of the crystal grain. Specifically, the number of pixels constituting each crystal grain is calculated, and the actual area of the crystal grain is calculated by multiplying the number of pixels by the area of one pixel.

In the SEM image used in the present disclosure, the length of one side of one pixel corresponds to 0.15 μm, so the number of pixels constituting each crystal grain is multiplied by $0.15 \times 0.15\ \mu m^2$. Furthermore, the circle-equivalent diameter is calculated by obtaining the diameter of a circle having this area.

The average crystal grain size is calculated by dividing the sum of the circle-equivalent diameters of the crystal grains thus obtained by the total number of crystal grains.

The above operation is repeated for six samples sampled from arbitrary locations on the fixing rotating member, and the average crystal grain size of each sample is calculated. Further, the arithmetic average value of these six average crystal grain sizes is calculated to calculate the average crystal grain size of the silver crystals of the electro-conductive layer.

The coefficient of variation of silver crystal grain size in the electro-conductive layer is preferably less than 0.60. The coefficient of variation is more preferably 0.55 or less, still more preferably 0.51 or less.

Within the above range, more stable crystal interfaces are formed, and cracks are less likely to occur at the crystal interfaces. Since the lower limit is preferably as small as possible, it is not particularly limited, but is preferably 0.00 or more, 0.10 or more. The coefficient of variation is, for example, from 0.00 to less than 0.60, from 0.00 to 0.55, from 0.10 to 0.55, and from 0.10 to 0.51.

The coefficient of variation of the crystal grain size of silver is calculated from the standard deviation and the arithmetic average value of the circle-equivalent diameter of each grain obtained in the measurement of the average grain size (standard deviation/arithmetic average value).

A fixing rotating member having the electro-conductive layer, and a fixing device and an electrophotographic image forming apparatus manufactured using the same will be described in detail below based on specific configurations.

However, the dimensions, materials, shapes, and relative arrangement of the components described in the embodiments should be changed, as appropriate, according to the configuration of the members and various conditions to which the disclosure is applied. That is, the scope of this disclosure is not intended to be limited to the following embodiments. Further, in the following description, configurations having the same functions are given the same reference numbers in the drawings, and the description thereof may be omitted.

Electrophotographic Image Forming Apparatus

An electrophotographic image forming apparatus (hereinafter also simply referred to as an "image forming apparatus") includes an image bearing member that bears a toner image, a transfer device that transfers the toner image onto a recording material, and a fixing device for fixing the transferred toner image to the recording material.

Figure 2:
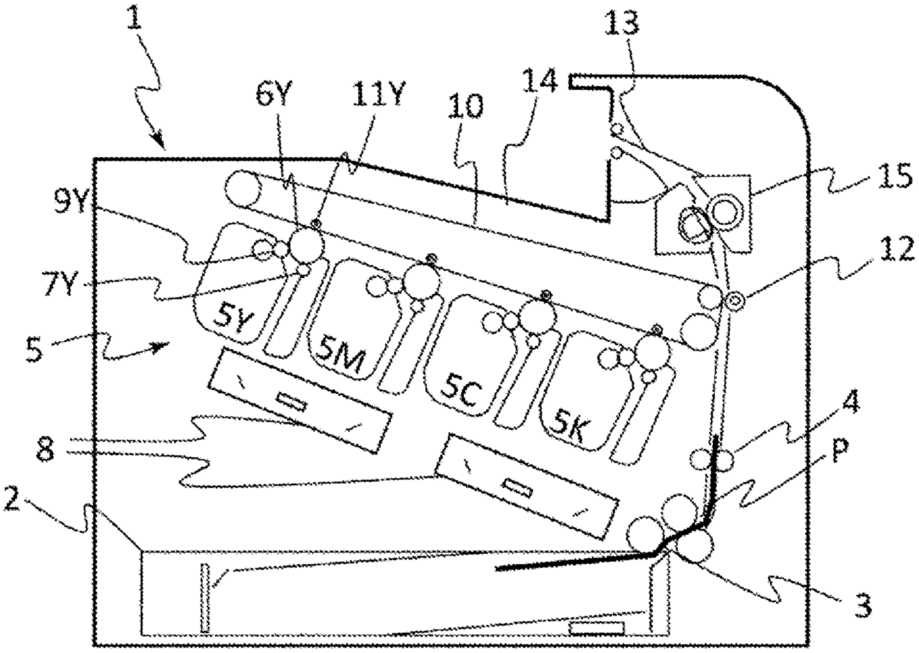
FIG. 2 is a schematic diagram of an electrophotographic image forming apparatus according to an embodiment.

FIG. 2 is a cross-sectional view showing the overall configuration of a color laser beam printer (hereinafter, printer) 1 as an example of an image forming apparatus equipped with a fixing device (image heating device) 15 according to the embodiment. A cassette 2 is housed in the lower part of the printer 1 so that the cassette can be pulled out. Sheets P as recording materials are stacked and accommodated in the cassette 2. The sheets P in the cassette 2 are fed to registration rollers 4 while being separated one by one by separation rollers 3.

A variety of sheets of different sizes and materials can be used as the sheet P, which is the recording material, examples thereof including paper such as plain paper and thick paper, surface-treated sheet materials such as plastic films, cloth, and coated paper, and special-shaped sheet materials such as envelopes and index paper.

The printer 1 includes an image forming unit 5 as image forming means in which image forming stations 5Y, 5M, 5C, and 5K corresponding to the respective colors of yellow, magenta, cyan, and black are arranged in a horizontal row. The image forming station 5Y is provided with a photosensitive drum 6Y, which is an image bearing member (electrophotographic photosensitive member) for bearing a toner image, and a charging roller 7Y as charging means for uniformly charging the surface of the photosensitive drum 6Y.

Further, a scanner unit 8 is arranged below the image forming unit 5. The scanner unit 8 irradiates the photosensitive drum 6Y with a laser beam that is ON/OFF-modulated in accordance with a digital image signal that is input from an external device such as a computer (not shown) on the basis of image information and generated by image processing means, thereby forming an electrostatic latent image on the photosensitive drum. Further, the image forming station 5Y includes a developing roller 9Y as developing means for attaching toner to the electrostatic latent image on the photosensitive drum 6Y and developing the latent image into a toner image, and a primary transfer section 11Y that transfers the toner image on the photosensitive drum 6Y to an intermediate transfer belt 10.

On the toner image on the intermediate transfer belt 10 to which the toner image has been transferred by the primary transfer section 11Y, toner images formed in the other image forming stations 5M, 5C, and 5K in a similar process are multiple-transferred. A full-color toner image is thereby formed on the intermediate transfer belt 10. This full-color toner image is transferred onto the sheet P by a secondary transfer section 12 as transfer means. The primary transfer section 11Y and the secondary transfer section 12 are examples of a fixing device that fixes the transferred toner image onto the recording material.

After that, the toner image transferred onto the sheet P (on the recording material) passes through the fixing device 15 and is fixed as a fixedly attached image. Further, the sheet P passes through the discharging/transporting section 13 and is discharged and stacked on a stacking section 14.

The image forming unit 5 is an example of image forming means. Although the primary transfer section 11Y and the secondary transfer section 12 are exemplified as the fixing device, the fixing device may be, for example, a direct transfer type fixing device that directly transfers the toner image from the image bearing member to the sheet P. Further, the image forming apparatus may have a monochrome configuration using toner of only one color.

Fixing Device

Figure 3:
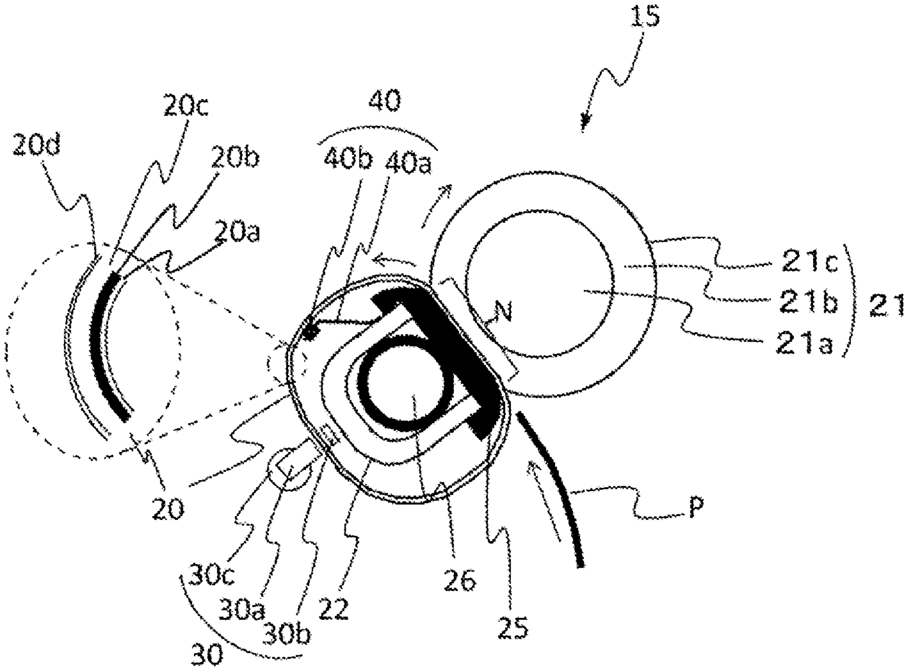
FIG. 3 is a schematic diagram showing the cross-sectional configuration of a fixing device according to an embodiment.
Figure 4:
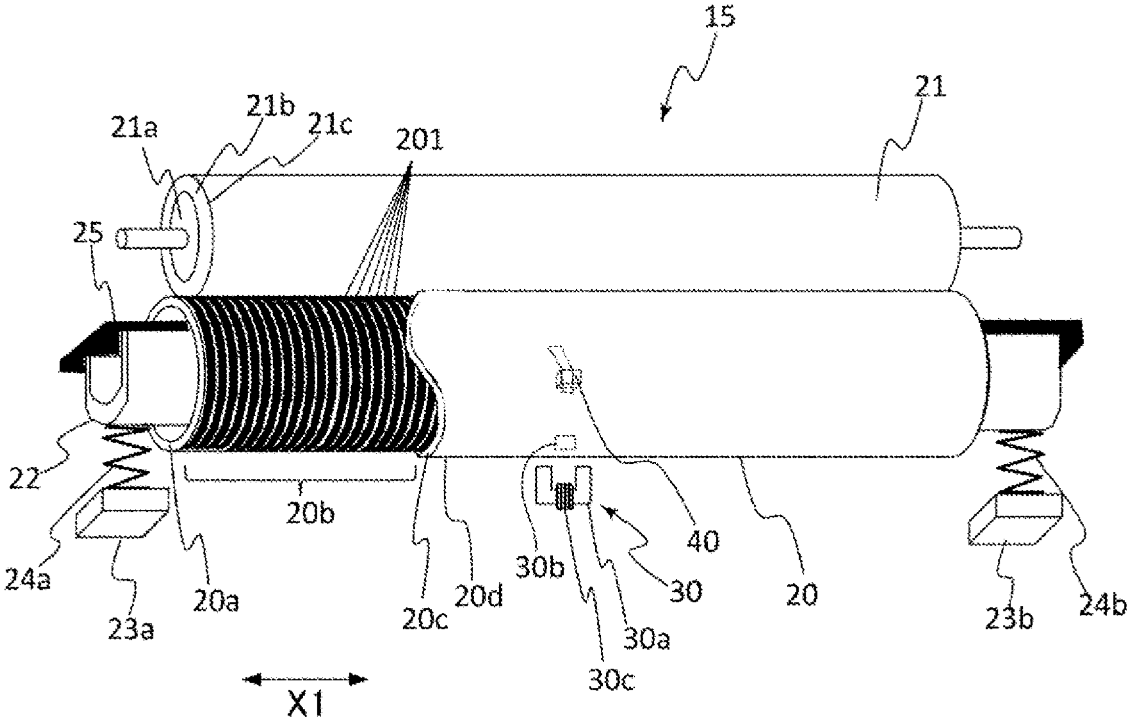
FIG. 4 is a schematic diagram showing the cross-sectional configuration of the fixing device according to an embodiment.

The fixing device 15 of the present embodiment is an induction heating type fixing device (image heating device) that causes the fixing rotating member to generate heat by electromagnetic induction. FIG. 3 shows a cross-sectional configuration of the fixing device 15, and FIG. 4 is a perspective view of the fixing device 15. A housing of the fixing device 15 and the like are omitted in FIGS. 3 and 4. In the following description, with respect to the members constituting the fixing device 15, the longitudinal direction X1 is a direction perpendicular to the transport direction of the recording material and the thickness direction of the recording material.

The fixing device 15 includes a fixing rotating member 20, a film guide 25, a pressure roller 21, a pressure stay 22, a magnetic core 26, an excitation coil 27 (FIG. 5), a thermistor 40 and a current sensor 30. The fixing device 15 heats the recording material on which the image is formed to fix the image onto the recording material. The fixing rotating member 20 is the rotating body of the present embodiment, and the pressure roller 21 is the opposing member of the present embodiment. Also, the excitation coil 27 functions as magnetic field generating means of the present embodiment. Details of the fixing rotating member will be described hereinbelow.

The fixing rotating member 20 has an electro-conductive layer 20*b* as a heat generating layer on a base material. The electro-conductive layer 20*b* can generate heat by, for example, an induced current. In the electro-conductive layer (heat generating layer) 20*b*, heat generating rings 201 (FIG. 4), which are electrically connected and formed in a ring shape in the circumferential direction and are electrically divided in the longitudinal direction X1 (rotation axis direction of the fixing rotating member 20), are formed as a heat generating pattern aligned in the longitudinal direction.

In other words, the electro-conductive layer 20*b* is divided into a plurality of annular regions which are connected to each other in the circumferential direction of the fixing rotating member 20 and which are not mutually conductive in the rotation axis direction of the fixing rotating member 20. Each heat generating ring 201, which is a component of the heat generating pattern, is formed with a uniform width in the longitudinal direction X1.

The pressure roller 21 as a facing member (pressing member) facing the fixing rotating member 20 includes a metal core 21*a* and an elastic layer 21*b* that is concentrically and integrally molded and coated around the metal core in a roller shape, and is provided with a release layer 21*c* as a surface layer. The elastic layer 21*b* is preferably made of a material having good heat resistance, such as silicone rubber, fluororubber, or fluorosilicone rubber. Both ends of the metal core 21*a* in the longitudinal direction are installed to be rotatably held by conductive bearings between metal plates (not shown) on the device chassis side.

Further, as shown in FIG. 4, pressure springs 24*a* and 24*b* are contracted between both ends of the pressure stay 22 in the longitudinal direction and spring receiving members 23*a* and 23*b* on the device chassis side, respectively, thereby applying a pressing force to the pressure stay 22.

In the fixing device 15 of the present embodiment, a total pressing force of approximately from 100N to 300N (from approximately 10 kgf to approximately 30 kgf) is applied. As a result, the lower surface of the film guide 25 made of a heat-resistant resin PPS or the like and the upper surface of the pressure roller 21 are pressed toward each other while sandwiching the fixing rotating member 20, which is a cylindrical rotating member, to form a fixing nip portion N having a predetermined width.

The film guide 25 functions together with the pressure roller 21 as nip portion forming members that form a nip portion for nipping and transporting the recording material that bears a toner image with the fixing rotating member 20 interposed therebetween.

Here, PPS is polyphenylene sulfide.

The pressure roller 21 is driven to rotate clockwise by driving means (not shown), and a counterclockwise rotational force acts on the fixing rotating member 20 due to the frictional force with the outer surface of the fixing rotating member 20. As a result, the fixing rotating member 20 rotates while sliding on the film guide 25.

Figure 5:
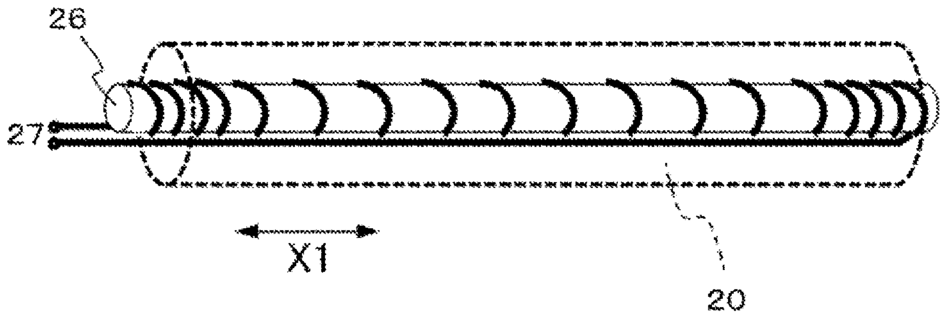
FIG. 5 is a schematic diagram of a magnetic core and an excitation coil of the fixing device according to the embodiment.

FIG. 5 is a schematic diagram of the magnetic core 26 and the excitation coil 27 in FIG. 3, and the fixing rotating member 20 is shown in the figure by a dashed line in order to explain the positional relationship with the fixing rotating member 20. The induction heating device in the induction heating type fixing device that causes the fixing rotating member 20 to generate heat by electromagnetic induction may include a magnetic core 26 and an excitation coil 27.

The excitation coil 27 is arranged inside the fixing rotating member 20. The excitation coil 27 has a helical portion with a helical axis substantially parallel to the rotation axis of the fixing rotating member 20, and forms an alternating magnetic field that causes the electro-conductive layer 20*b* to generate heat by electromagnetic induction. "Substantially parallel" means not only that the two axes are perfectly parallel, but also that a slight deviation is allowed to the extent that the electro-conductive layer can generate heat by electromagnetic induction.

The magnetic core 26 is arranged in the helical portion and extends in the rotation axis direction of the fixing rotating member 20 so as not to form a loop outside the fixing rotating member 20. The magnetic core 26 induces lines of magnetic force of an alternating magnetic field.

In FIG. 5, the magnetic core 26 is inserted through the hollow portion of the fixing rotating member 20, which is a cylindrical rotating body. Further, the excitation coil 27 is spirally wound around the outer periphery of the magnetic core 26 and extends in the longitudinal direction of the fixing rotating member 20. The magnetic core 26 has a columnar shape and is fixed by fixing means (not shown) so as to be positioned substantially in the center of the fixing rotating member 20 in a cross-section viewed in the longitudinal direction (see FIG. 3).

The magnetic core 26 provided inside the excitation coil 27 acts to guide the lines of magnetic force (magnetic flux) of the alternating magnetic field generated by the excitation coil 27 to the inner side of the electro-conductive layer 20*b* of the fixing rotating member 20 and to form a path (magnetic path) of the lines of magnetic force. The material of the magnetic core 26 is ferromagnetic. The material of the magnetic core 26, which is a ferromagnetic material, is preferably a material having a small hysteresis loss and a high relative magnetic permeability, for example, at least one soft magnetic material having a high magnetic permeability selected from the group consisting of baked ferrite, ferrite resin, and the like.

The shape is preferably such that 70% or more of the magnetic flux emanated from one longitudinal end of the magnetic core 26 in the rotation axis direction passes outside of the electro-conductive layer 20*b* and returns to the other longitudinal end of the magnetic core 26.

The magnetic core 26 may have any cross-sectional shape that can be accommodated in the hollow portion of the fixing rotating member 20, and does not need to be circular, but preferably has a shape that allows the cross-sectional area to be as large as possible. In the present embodiment, the magnetic core 26 has a diameter of 10 mm and a longitudinal length of 280 mm.

The excitation coil 27 is formed by spirally winding a copper wire material (single conductive wire) with a diameter of 1 mm to 2 mm that is coated with a heat-resistant polyamideimide around the magnetic core 26 with 20 turns. The excitation coil 27 is wound around the magnetic core 26 in a direction intersecting the rotation axis direction of the fixing rotating member 20. Therefore, where a high-frequency alternating current is passed through the excitation coil 27, an alternating magnetic field is generated in a direction parallel to the rotation axis direction, and an induced current (circulating current) flows in each heat generating ring 201 of the electro-conductive layer 20*b* of the fixing rotating member 20 according to the principle described hereinbelow and heat is generated therein.

As shown in FIGS. 3 and 4, the thermistor 40 as temperature detection means for detecting the temperature of the fixing rotating member 20 is composed of a spring plate 40*a* and a thermistor element 40*b*. The spring plate 40*a* is a support member having spring elasticity extending toward the inner surface of the fixing rotating member 20. The thermistor element 40*b* as a temperature detecting element is installed at the tip of the spring plate 40*a*. The surface of the thermistor element 40*b* is covered with a 50 μm thick polyimide tape to ensure electrical insulation.

The thermistor 40 is installed by fixedly attaching to the film guide 25 at a substantially central position of the fixing rotating member 20 in the longitudinal direction. The thermistor element 40*b* is pressed against the inner surface of the fixing rotating member 20 and held in contact therewith by spring elasticity of the spring plate 40*a*. The thermistor 40 may be arranged on the outer peripheral side of the fixing rotating member 20.

The current sensor 30 constituting a conduction monitoring device for monitoring conduction in the circumferential direction of the electro-conductive layer 20*b* is arranged at the same position as the thermistor 40 in the longitudinal direction of the fixing device 15. That is, the current sensor 30 monitors the conduction state of the heat generating ring 201 at the position in contact with the thermistor element 40*b*, among the plurality of heat generating rings 201 forming the heat generating pattern of the fixing rotating member 20.

Heating Principle

Figure 6:
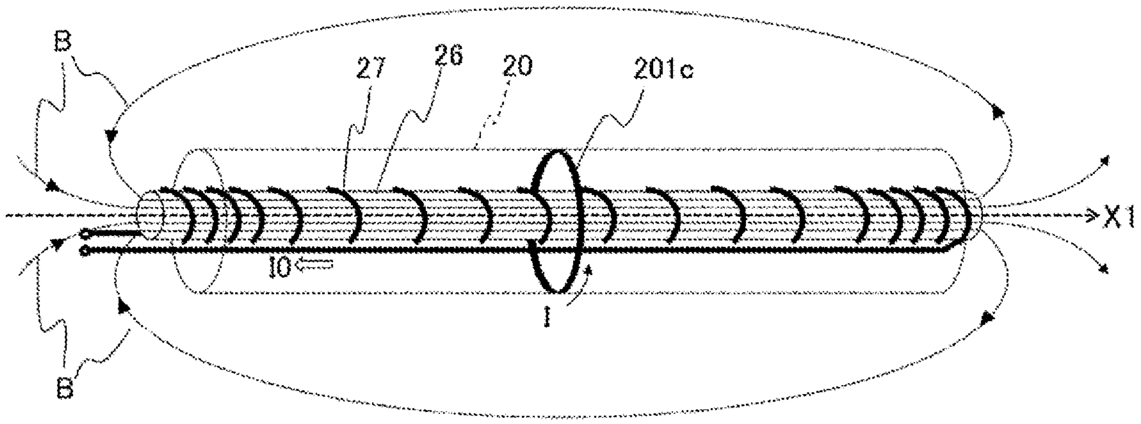
FIG. 6 shows a magnetic field formed when current is passed through the excitation coil according to the embodiment.

The heating principle of the fixing rotating member 20 in the induction heating type fixing device 15 will be described hereinbelow. FIG. 6 is a conceptual diagram showing the moment when the current in the excitation coil 27 increases in the direction of an arrow 10. The excitation coil 27 is inserted into the fixing rotating member 20 and functions as magnetic field generating means that forms an alternating magnetic field in the rotation axis direction of the fixing rotating member 20 when an alternating current is passed therethrough, thereby generating an induced current I in the circumferential direction of the fixing rotating member 20.

Further, the magnetic core 26 functions as a member that guides the lines B of magnetic force (dotted lines in the figure) generated by the excitation coil 27 and forms a magnetic path. In a general induction heating method, the lines of magnetic force pass through the electro-conductive layer to generate an eddy current, whereas in the configuration of the present embodiment, the lines B of magnetic force form loops outside the fixing rotating member. That is, heat is mainly generated in the electro-conductive layer 20*b* by the induced current induced by the lines of magnetic force that exit from one longitudinal end of the magnetic core 26, pass outside the electro-conductive layer 20*b*, and return to the other longitudinal end of the magnetic core 26. By doing so, heat can be efficiently generated even if the thickness of the electro-conductive layer is as small as, for example, 4 μm or less.

Where an alternating magnetic field is generated by the excitation coil 27, an induced current I according to Faraday's law flows through each heat generating ring 201 of the electro-conductive layer 20*b* of the fixing rotating member 20. Faraday's law states that "where a magnetic field in a circuit is changed, an induced electromotive force is generated that causes a current to flow in the circuit, and the induced electromotive force is proportional to the time change of the magnetic flux that runs vertically through the circuit."

For a heat generating ring 201*c* located in the central portion in the longitudinal direction of the magnetic core 26 shown in FIG. 6, the induced current I that flows through the heat generating ring 201*c* when a high-frequency alternating current is passed through the excitation coil 27 is considered hereinbelow. When the high-frequency alternating current is passed through, an alternating magnetic field is formed inside the magnetic core 26. At this time, the induced electromotive force acting on the heat generating ring 201*c* is proportional to the time change of the magnetic flux running vertically through the inside of the heat generating ring 201*c* according to Equation 1 below.

$$V = -N\frac{\Delta\Phi}{\Delta t} \qquad \text{Equation 1}$$

V: induced electromotive force,

N: number of coil turns,

ΔΦ/Δt: change in magnetic flux running vertically in the circuit (heat generating ring 201*c*) in minute time Δt.

Due to this induced electromotive force V, an induced current I, which is a circulating current that circulates in the heat generating ring 201*c*, flows, and Joule heat generated by the induced current I causes the heat generating ring 201*c* to generate heat.

However, where the heat generating ring 201*c* is disconnected, the induced current I does not flow and the heat generating ring 201*c* does not generate heat.

(1) Schematic Configuration of Fixing Rotating Member

The details of the fixing rotating member of the present embodiment will be described with reference to the drawings.

The fixing rotating member according to one aspect of the present disclosure can be, for example, a rotatable member such as an endless belt.

Figure 7:
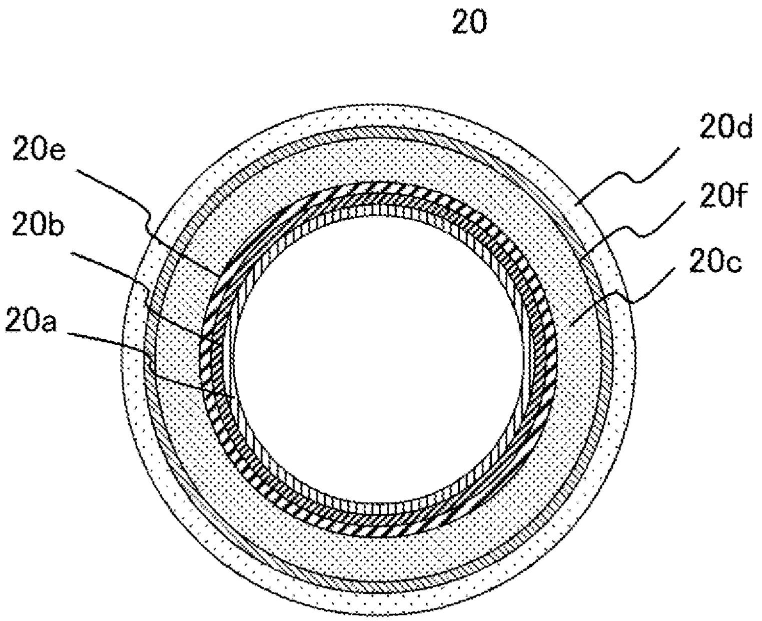
FIG. 7 is a cross-sectional configuration diagram of a fixing rotating member according to the embodiment.

FIG. 7 is a circumferential cross-sectional view of the fixing rotating member. As shown in FIG. 7, the fixing rotating member has a base material 20*a*, the electro-conductive layer 20*b* on the outer surface of the base material 20*a*, and a resin layer 20*e* on the outer surface of the electro-conductive layer. An elastic layer 20*c* and a surface layer (release layer) 20*d* may be provided on the resin layer 20*e* as necessary, and an adhesive layer 20*f* may be provided between the elastic layer 20*c* and the surface layer 20*d*.

(2) Base Material

The material of the base material 20*a* is not particularly limited. The base material 20*a* preferably contains a resin (preferably a heat-resistant resin). When a belt is used in the electromagnetic induction type fixing device, the base material 20*a* is preferably a layer that maintains high strength with little change in physical properties when the electro-conductive layer generates heat. For this reason, the base material 20*a* preferably contains a heat-resistant resin as a main component and is preferably made of a heat-resistant resin.

The resin contained in the base material 20*a* (preferably the resin constituting the base material) preferably contains at least one selected from the group consisting of polyimides (PI), polyamideimides (PAI), modified polyimides and modified polyamideimides. More preferably, it is at least one selected from the group consisting of polyimides and polyamideimides. Among these, a polyimide is particularly preferred. In addition, in the present disclosure, the main component means the component with the largest content among the components constituting the object (here, the base material).

Modification in modified polyimides and modified polyamideimides includes siloxane modification, carbonate modification, fluorine modification, urethane modification, triazine modification, and phenol modification.

A filler may be added to the base material 20*a* to improve heat insulation and strength.

The shape of the base material can be selected, as appropriate, according to the shape of the fixing rotating member, and the base material can be of various shapes such as an endless belt shape, a hollow cylindrical shape, and a film shape.

In the case of a fixing belt, the thickness of the base material 20*a* is, for example, preferably from 10 μm to 100 μm, more preferably from 20 μm to 60 μm. By setting the thickness of the base material 20*a* within the above ranges, both strength and flexibility can be achieved at high levels.

In addition, on the surface of the base material 20*a* opposite to the side facing the electro-conductive layer 20*b*, there can be provided, for example, a layer for preventing wear of the inner peripheral surface of the fixing belt when the inner peripheral surface of the fixing belt comes into contact with other members, or a layer for improving slidability with other members.

In order to improve adhesion with the electro-conductive layer 20*b* and wettability, the outer peripheral surface of the base material 20*a* may be subjected to surface roughening treatment such as blasting, and modification treatment such as treatment with ultraviolet light or plasma, chemical etching, and the like.

(3) Conductive Layer

The electro-conductive layer 20*b* is a layer that generates heat when energized. According to the principle of heat generation by induction heating using an excitation coil, where an alternating current is supplied to the excitation coil placed near the fixing rotating member, a magnetic field is induced, an electric current is generated by the magnetic field in the electro-conductive layer 20*b* of the fixing rotating member, and Joule heat is generated.

As described above, the average grain size of silver crystals observed in the cross section along the circumferential direction of the electro-conductive layer 20*b* is from 20 nm to 200 nm. This is because, where the average crystal grain size is within the above range, even if the fixing rotating member 20 is pressurized and deformed at the nip portion N and repeatedly subjected to stress, a large number of stable crystal interfaces are formed in the electro-conductive layer 20*b*, whereby the occurrence of cracks at the crystal interface is suppressed. As a result, no fatigue fracture occurs in the electro-conductive layer 20*b* of the fixing rotating member 20 even if repeated bending continues until the durability life of the fixing device.

The average crystal grain size is preferably from 20 nm to 150 nm, more preferably from 20 nm to 120 nm, and still more preferably from 20 nm to 100 nm. The average grain size can be increased by changing the baking temperature and baking time.

The electro-conductive layer 20*b* has a volume resistivity of from $1.0\times10^{-8}$ Ω·m to $8.0\times10^{-8}$ Ω·m. This is because where the volume resistivity is within the above range, stable Joule heat is generated. Where the volume resistivity is below the range, the amount of current generated in the electro-conductive layer 20*b* is large, but the resistance is small and the amount of Joule heat generated is small, so that a sufficient amount of heat to fixedly attach the toner cannot be obtained. Meanwhile, where the volume resistivity is above the range, the amount of current generated in the electro-conductive layer 20*b* is small, the Joule heat generated is small, and a sufficient amount of heat is not obtained for fixedly attaching the toner.

The volume resistivity of the electro-conductive layer 20*b* is preferably $2.0\times10^{-8}$ Ω·m or more, more preferably $2.5\times10^{-8}$ Ω·m or more. Also, it is preferably $7.0\times10^{-8}$ Ω·m or less, more preferably $6.0\times10^{-8}$ Ω·m or less. For example, it is preferably in the ranges of from $2.0\times10^{-8}$ Ω·m to $7.0\times10^{-8}$ Ω·m and from $2.0\times10^{-8}$ Ω·m to $6.0\times10^{-8}$ Ω·m.

The volume resistivity of the electro-conductive layer 20*b* can be controlled by, for example, the material of the electro-conductive layer and the manufacturing method of the electro-conductive layer. Specifically, for the material of the electro-conductive layer, for example, when the electro-conductive layer is formed using silver nano-ink, an electro-conductive layer with lower volume resistivity can be obtained by setting a higher baking temperature of the silver nano-ink film formed on the surface of the base material. This is because the organic material such as the dispersing agent contained in the silver nano-ink evaporates during the baking process at a high temperature, and the electro-conductive layer can be formed with a small content of components other than silver.

The volume resistivity of the electro-conductive layer in the fixing rotating member can be measured by resistance measurement by the 4-pin probe method (JIS KJ7194).

In the present disclosure, the volume resistivity was measured using a low-resistance resistivity meter (Loresta-GX MCP-T700, manufactured by Nittoseiko Analytech Co., Ltd.).

The content ratio of silver (silver purity) in the electro-conductive layer 20*b* is preferably 99.0% by mass or more. It is more preferably 99.2% by mass or more, still more preferably 99.3% by mass or more. This is because where the purity of silver is 99.0% by mass or more, the proportion of impurities that hinder the generation of current in the electro-conductive layer 20*b* is small, the resistance is suitable for the electro-conductive layer, and the generated Joule heat is large.

The higher the content ratio of silver, the more preferable it is, and the upper limit is not particularly limited. For example, it is preferably 100% by mass or less, 99.9% by mass or less, and 99.8% by mass or less.

The content ratio of silver in the fixing rotating member can be measured by the following method.

From the fixing rotating member, 6 samples each having a length of 5 mm, a width of 5 mm, and a thickness equal to the total thickness of the fixing rotating member are collected from arbitrary locations of the fixing rotating member. For the obtained six samples, the circumferential cross section of the fixing rotating member is exposed with a cross section polisher (trade name: SM09010, manufactured by JEOL Ltd.).

Subsequently, the exposed cross section of the electro-conductive layer is observed with a scanning electron microscope (SEM) (trade name: JSM-F100, manufactured by JEOL Ltd.), and analysis of the silver crystal grains in the observed image is performed by energy dispersive X-ray spectroscopy (EDS). Observation conditions are 20,000 times, secondary electron image acquisition mode, EDS analysis conditions are acceleration voltage 5.0 kV and working distance: 10 mm. For the spatial range for EDS analysis, area designation is performed and adjustment is conducted so that only silver crystal grains within the observed image are selected.

One image is acquired for one sample, and EDS analysis is performed at three locations within one image. By analyzing the silver content ratio at a total of 18 points in six samples and calculating the arithmetic average value, the silver content ratio in the fixing rotating member can be measured.

The maximum thickness of the electro-conductive layer 20*b* is preferably 4 μm or less. This is because it is desirable to give the fixing rotating member an appropriate degree of flexibility and to reduce heat capacity thereof. Yet another advantage is an improvement in bending resistance. As shown in FIG. 3, the fixing rotating member 20 is rotationally driven while being pressed by the film guide 25 and the pressure roller 21. Each time the fixing rotating member 20 rotates, it is pressurized and deformed and receives stress at the nip portion N.

It is preferable to design the electro-conductive layer 20*b* of the fixing rotating member 20 so that no fatigue fracture occurs even if the repeated bending continues until the durability life of the fixing device. Reducing the thickness of the electro-conductive layer 20*b* greatly improves the resistance of the electro-conductive layer 20*b* to fatigue fracture. This is because the thinner the electro-conductive layer 20*b*, the smaller the internal stress acting on the electro-conductive layer 20*b* when the electro-conductive layer 20*b* is pressed and deformed along the curved surface of the film guide 25.

For the above reasons, it is preferable to set the maximum thickness of the electro-conductive layer 20*b* to 4 μm or less from the viewpoint of reducing the heat capacity and further improving resistance to fatigue fracture. The maximum thickness of the electro-conductive layer 20*b* is more preferably 3 μm or less. Although the lower limit is not particularly limited, it is preferably 1 μm or more. The maximum thickness of the electro-conductive layer 20*b* is, for example, from 1 μm to 4 μm and from 1 μm to 3 μm.

The maximum thickness of the electro-conductive layer in the fixing rotating member can be measured by the following method.

From the fixing rotating member, 6 samples each having a length of 5 mm, a width of 5 mm, and a thickness equal to the total thickness of the fixing rotating member are collected from arbitrary locations of the fixing rotating member. For the obtained six samples, the circumferential cross section of the fixing rotating member is exposed with a cross section polisher (trade name: SM09010, manufactured by JEOL Ltd.).

Subsequently, the exposed cross section of the electro-conductive layer is observed with a scanning electron microscope (SEM) (trade name: JSM-F100, manufactured by JEOL Ltd.) at an acceleration voltage of 3 kV, a working distance of 2.9 mm, and a magnification of 10,000 times, and an image of 13 μm in width and 10 μm height is obtained. For the electro-conductive layer in the obtained image, parallel lines are drawn at the point closest to the base material side and the point closest to the resin layer on the opposite side, and the distance between the parallel lines is taken as the thickness in the image. The arithmetic average value for the six samples is defined as the maximum thickness. The parallel lines are drawn with reference to the surface of the base material opposite to the electro-conductive layer in the observation area.

The electro-conductive layer 20*b* extends in the circumferential direction of the outer peripheral surface of the base material 20*a*. The electro-conductive layer 20*b* may be configured in a predetermined pattern as long as it can generate heat when energized. In particular, a configuration in which a plurality of conductive layers 20*b* shaped by rings in the circumferential direction of the fixing rotating member as shown in FIG. 4 is formed in an electrically divided state in the rotation axis direction is preferable from the viewpoint of safety. By adopting such a configuration, it is possible to suppress a local temperature rise when a crack occurs in the electro-conductive layer 20*b*. The ring shape preferably has a substantially constant width in the axial direction of the rotating body.

However, where such a pattern configuration is adopted, the surface area of the electro-conductive layer 20*b* increases and the risk of deterioration due to oxidation increases, so silver is used. In addition, from the viewpoint of durability against bending, pattern formation makes it easier to apply a load than in the case of homogeneous and uniform film. Therefore, by setting the abovementioned specific average crystal grain size, durability is increased.

The width of the ring of the electro-conductive layer 20*b* is preferably 100 μm or more, more preferably 200 μm or more, from the viewpoint of manufacturability and heat generation. From the viewpoint of heat generation unevenness and safety, the width is preferably 500 μm or less, more preferably 400 μm or less. The width of the ring is, for example, from 100 μm to 500 μm, and from 200 μm to 400 μm.

The distance between the rings of the electro-conductive layer 20*b* is preferably 50 μm or more, more preferably 100 μm or more, from the viewpoint of manufacturability and heat generation. From the viewpoint of heat generation unevenness, the distance is preferably 400 μm or less, more preferably 300 μm or less. The distance between rings is, for example, from 50 μm to 300 μm and from 100 μm to 300 μm.

(4) Resin Layer

The fixing rotating member may have a resin layer 20*e* on the surface side of the electro-conductive layer 20*b* opposite to the side facing the base material 20*a*. The resin layer 20*e* protects the electro-conductive layer 20*b* and has functions of preventing oxidation of the electro-conductive layer 20*b*, ensuring insulation, and improving strength.

The material constituting the resin layer 20*e* is not particularly limited. The material of the resin layer 20*e* is preferably a layer containing at least a resin. When a belt is used in an electromagnetic induction fixing device, the resin layer 20*e* is preferably a layer that is similar to the base material 20*a* in terms of maintaining high strength with little change in physical properties when the electro-conductive layer generates heat.

For this reason, the resin layer 20*e* preferably contains a heat-resistant resin, more preferably contains a heat-resistant resin as a main component and is further preferably made of a heat-resistant resin. A heat-resistant resin is, for example, a resin that does not melt or decompose at temperatures below 200° C. (preferably below 250° C.).

The resin forming the resin layer 20*e* preferably contains at least one selected from the group consisting of polyimides (PI), polyamideimides (PAI), modified polyimides and modified polyamideimides. More preferably, it is at least one selected from the group consisting of polyimides and polyamideimides. Modification is the same as described for the base material 20*a*.

Among these, a polyimide is particularly preferred. In addition, the main component means the component contained with the largest content among the components constituting the object (here, the resin layer). A method of forming the base material 20*a* and the resin layer 20*e* is not particularly limited. For example, an imide-based material in a liquid state called varnish can be coated and baked by a known method to form a film.

From the viewpoint of heat conductivity, the resin layer 20*e* may contain a thermally conductive filler. By improving heat conductivity, the heat generated in the electro-conductive layer 20*b* can be efficiently transferred to the outer surface of the fixing rotating member.

The thickness of the resin layer 20*e* is preferably from 10 μm to 100 μm, more preferably from 20 μm to 60 μm.

From the viewpoint of bending resistance of the electro-conductive layer 20*b*, the thickness of the resin layer 20*e* is preferably the same as the thickness of the base material 20*a*. For example, the ratio of the difference in thickness between the base material and the resin layer to the thickness of the base material is preferably 20% or less, 10% or less, or 5% or less. This is because by reducing the difference in thickness, even when the electro-conductive layer 20*b* is repeatedly bent at the nip portion, the stress applied to the electro-conductive layer 20*b* is evenly distributed, thereby suppressing the occurrence of cracks in the electro-conductive layer 20*b*.

The analysis of materials of the base material 20*a* and the resin layer 20*e* in the fixing rotating member can be performed by the following procedure.

A 10 mm square sample is cut out from the fixing rotating member, and where there is an elastic layer or surface layer, this layer is removed with a razor or solvent. The quality of the material can be confirmed by subjecting the obtained sample to attenuated total reflection (ATR) measurement using an infrared spectrometer (FT-IR) (for example, product name: Frontier FT IR, manufactured by PerkinElmer Inc.).

(5) Elastic Layer

The fixing rotating member may have an elastic layer 20*c* on the outer surface of the resin layer 20*e*. The elastic layer 20*c* is a layer for imparting flexibility to the fixing rotating member in order to ensure a fixing nip in the fixing device. When the fixing rotating member is used as a heating member that contacts the toner on the paper, the elastic layer 20*c* also functions as a layer for imparting flexibility so that the surface of the heating member can follow the unevenness of the paper.

The elastic layer 20*c* includes, for example, rubber as a matrix and particles dispersed in the rubber. More specifically, the elastic layer 20*c* preferably contains rubber and a thermally conductive filler and is preferably composed of a cured product obtained by curing a composition including at least a rubber raw material (base polymer, crosslinking agent, and the like) and a thermally conductive filler.

From the viewpoint of exhibiting the functions of the elastic layer 20*c* described above, the elastic layer 20*c* is preferably composed of a cured silicone rubber containing thermally conductive particles, and is more preferably composed of a cured product of an addition-curable silicone rubber composition.

The silicone rubber composition can contain, for example, thermally conductive particles, a base polymer, a cross-linking agent, a catalyst, and, if necessary, additives. Since most silicone rubber compositions are liquid, the thermally conductive filler is easily dispersed, and by adjusting the degree of cross-linking according to the type and addition amount of the thermally conductive filler, it is easy to adjust the elasticity of the elastic layer 20*c* to be produced.

The matrix functions to develop elasticity in the elastic layer 20*c*. The matrix preferably contains silicone rubber from the viewpoint of exhibiting the function of the elastic layer 20*c* described above. Silicone rubber is preferable because it has high heat resistance so that flexibility can be maintained even in an environment where the non-paper-passing area reaches a high temperature of about 240° C. As the silicone rubber, for example, a cured product of an addition-curable liquid silicone rubber composition described hereinbelow can be used. The elastic layer 20*c* can be formed by applying and heating a liquid silicone rubber composition by a known method.

A liquid silicone rubber composition usually contains the following components (a) to (d):

Component (a): an organopolysiloxane having an unsaturated aliphatic group;

Component (b): an organopolysiloxane having active hydrogen bonded to silicon;

Component (c): a catalyst;

Component (d): a thermally conductive filler

Each component will be described below.

Component (a)

An organopolysiloxane having an unsaturated aliphatic group is an organopolysiloxane having an unsaturated aliphatic group such as a vinyl group, and examples thereof include those represented by the following formulas (1) and (2).

(1)

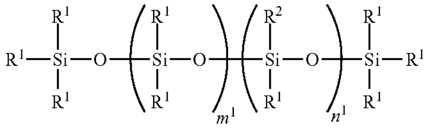

In formula (1), $m^1$ represents an integer of 0 or more, and $n^1$ represents an integer of 3 or more. Further, in structural formula (1), each $R^1$ independently represents a monovalent unsubstituted or substituted hydrocarbon group containing no unsaturated aliphatic group, provided that at least one of $R^1$ represents a methyl group and each $R^2$ independently represents an unsaturated aliphatic group.

(2)

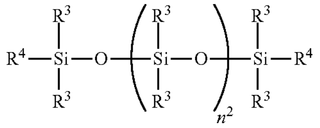

In formula (2), $n^2$ represents a positive integer, and each $R^3$ independently represents a monovalent unsubstituted or substituted hydrocarbon group containing no unsaturated aliphatic group, provided that at least one of $R^3$ represents a methyl group, and each $R^4$ independently represents an unsaturated aliphatic group.

In formulas (1) and (2), examples of the monovalent unsubstituted or substituted hydrocarbon group containing no unsaturated aliphatic group, which can be represented by $R^1$ and $R^3$, include the following groups.

Unsubstituted hydrocarbon group

Alkyl group (for example, methyl group, ethyl group, propyl group, butyl group, pentyl group, and hexyl group).

Aryl group (for example, phenyl group).

Substituted hydrocarbon group

Substituted alkyl group (for example, chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, 50% or more of each of $R^1$ and $R^3$ are preferably methyl groups, and more preferably all $R^1$ and $R^3$ are methyl groups, for ease of synthesis and handling.

Also, examples of unsaturated aliphatic groups that can be represented by $R^2$ and $R^4$ in formulas (1) and (2) include the following groups. Examples of unsaturated aliphatic groups include a vinyl group, an allyl group, a 3-butenyl group, a 4-pentenyl group, and a 5-hexenyl group. Among these groups, both $R^2$ and $R^4$ are preferably vinyl groups because synthesis and handling are facilitated, cost is reduced, and a cross-linking reaction can be easily performed.

From the standpoint of moldability, the component (a) preferably has a viscosity of from 1000 $mm^2/s$ to 50,000 $mm^2/s$. Where the viscosity is less than 1000 $mm^2/s$, it will be difficult to adjust the hardness to the level required for the elastic layer 20*c*, and where the viscosity is more than 50,000 $mm^2/s$, the viscosity of the composition will be too high, making coating difficult. Viscosity (kinetic viscosity) can be measured using a capillary viscometer, a rotational viscometer, or the like, based on JIS Z 8803:2011.

The blending amount of component (a) is preferably 55% by volume or more from the viewpoint of durability and 65% by volume or less from the viewpoint of heat transfer, based on the liquid silicone rubber composition used to form the elastic layer 20*c*.

Component (b)

The organopolysiloxane having active hydrogen bonded to silicon functions as a cross-linking agent that reacts with the unsaturated aliphatic group of component (a) under the action of a catalyst to form a cured silicone rubber.

Any organopolysiloxane having a Si—H bond can be used as the component (b). In particular, from the viewpoint of reactivity with the unsaturated aliphatic group of component (a), an organopolysiloxane having an average number of silicon-bonded hydrogen atoms of 3 or more per molecule is preferably used.

Specific examples of component (b) include linear organopolysiloxane represented by formula (3) below and cyclic organopolysiloxane represented by formula (4) below.

(3)

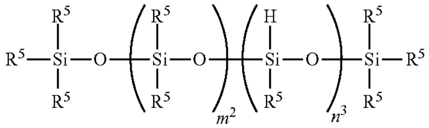

In formula (3), $m^2$ represents an integer of 0 or more, $n^3$ represents an integer of 3 or more, and $R^5$ each independently represents a monovalent unsubstituted or substituted hydrocarbon group containing no unsaturated aliphatic group.

(4)

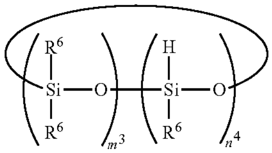

In formula (4), $m^3$ represents an integer of 0 or more, $n^4$ represents an integer of 3 or more, and $R^6$ each independently represents a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in formulas (3) and (4) include the same groups as those mentioned above for $R^1$ in structural formula (1). Among these, it is preferable that 50% or more of each of $R^5$ and $R^6$ be a methyl group and more preferably all $R^5$ and $R^6$ are methyl groups because synthesis and handling are easy and excellent heat resistance is easily obtained.

Component (c)

Examples of the catalyst used to form the silicone rubber include a hydrosilylation catalyst for accelerating the curing reaction. Known substances such as platinum compounds and rhodium compounds can be used as hydrosilylation catalysts. The blending amount of the catalyst can be appropriately set and is not particularly limited.

Component (d)

Examples of thermally conductive fillers include metals, metal compounds, and carbon fibers. Fillers that are highly thermally conductive are more preferred, and specific examples thereof include the following materials.

Silicon metal (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor grown carbon fiber, PAN-based (polyacrylonitrile) carbon fiber, pitch-based carbon fiber.

These fillers can be used alone or in combination of two or more.

The average particle size of the filler is preferably from 1 μm to 50 μm from the viewpoint of handling and dispersibility. As for the shape of the filler, spherical, pulverized, acicular, plate-shaped and whisker-shaped fillers can be used. In particular, from the viewpoint of dispersibility, the filler is preferably spherical. Furthermore, at least one of reinforcing filler, heat-resistant filler and coloring filler may be added.

(6) Adhesive Layer

The fixing rotating member may have an adhesive layer **20*f* on the outer surface of the elastic layer 20*c* for adhering the surface layer 20*d*, which will be described hereinbelow. The adhesive layer 20*f* is a layer for bonding the elastic layer 20*c* and the surface layer 20*d*. The adhesive used for the adhesive layer 20*f*** can be appropriately selected from known ones and used, and is not particularly limited. However, from the viewpoint of ease of handling, it is preferable to use an addition-curable silicone rubber blended with a self-adhesive component.

This adhesive can include, for example, a self-adhesive component, an organopolysiloxane having a plurality of unsaturated aliphatic groups represented by vinyl groups in molecular chain thereof, a hydrogen organopolysiloxane, and a platinum compound as a crosslinking catalyst. The adhesive layer **20*f* that bonds the surface layer 20*d* to the elastic layer 20*c* can be formed by curing, by an addition reaction, the adhesive applied to the surface of the elastic layer 20*c***.

Examples of the self-adhesive component include the following.

A silane having at least one, preferably two or more functional groups selected from the group consisting of an alkenyl group such as vinyl group, a (meth)acryloxy group, a hydrosilyl group (SiH group), an epoxy group, an alkoxysilyl group, a carbonyl group, and a phenyl group.

An organosilicon compound such as a cyclic or straight-chain siloxane having from 2 to 30 silicon atoms, preferably from 4 to 20 silicon atoms.

A non-silicon (that is, containing no silicon atoms in the molecule) organic compound which may contain an oxygen atom in the molecule. However, such compound contains from 1 to 4, preferably 1 or 2 aromatic rings such as a phenylene structure having a valence of from 1 to 4, preferably from 2 to 4, in one molecule.

In addition, at least one, preferably from two to four functional groups (for example, alkenyl group, (meth)acryloxy group) capable of contributing to a hydrosilylation addition reaction is contained in one molecule.

The above self-adhesive components may be used singly or in combination of two or more. From the viewpoint of adjusting viscosity and ensuring heat resistance, a filler component can be added to the adhesive within a range consistent with the gist of the present disclosure. Examples of the filler component include the following.

Silica, alumina, iron oxide, cerium oxide, cerium hydroxide, carbon black, and the like.

The compounding amount of each component contained in the adhesive is not particularly limited, and can be set as appropriate.

Such addition-curable silicone rubber adhesives have been marketed and are readily available. The thickness of the adhesive layer **20*f* is preferably 20 μm or less. By setting the thickness of the adhesive layer 20*f*** to 20 μm or less, when the fixing belt according to the present embodiment is used as a heating belt in a thermal fixing device, the heat resistance can be easily set to be small, and the heat from the inner surface is likely to be efficiently transferred to a recording medium.

(7) Surface Layer

The fixing rotating member may have a surface layer **20*d*. The surface layer 20*d* preferably contains a fluororesin in order to function as a release layer that prevents toner from adhering to the outer surface of the fixing rotating member. The surface layer 20*d* may be formed by, for example, using a tubular shape obtained by molding a resin exemplified below, or by coating a resin dispersion liquid to mold the surface layer 20*d***.

Tetrafluoroethylene-perfluoro(alkyl vinyl ether) copolymers (PFA), polytetrafluoroethylene (PTFE), tetrafluoroethylene-hexafluoropropylene copolymer (FEP), and the like.

Among the resin materials exemplified above, PFA are particularly preferably used from the viewpoint of moldability and toner releasability.

The thickness of the surface layer **20*d* is preferably from 10 μm to 50 μm. By setting the thickness of the surface layer 20*d*** within this range, it is easy to maintain an appropriate surface hardness of the fixing rotating member.

As described above, according to one aspect of the present disclosure, there is provided a fixing device in which a fixing rotating member is arranged. Therefore, it is possible to provide a fixing device in which a fixing rotating member having high conductivity and excellent durability is arranged.

(8) Method for Manufacturing Fixing Rotating Member

A non-limiting method for manufacturing a fixing rotating member (pressure belt or pressure roller) comprising a base material and an electro-conductive layer on the base material, the electro-conductive layer containing silver, according to one aspect of the present disclosure is exemplified hereinbelow. A manufacturing method using a silver nanoparticle material can be exemplified by a method including the following steps (i) to (ii).

(i) A step of obtaining a base material.

(ii) A step of applying a silver nanoparticle ink to the outer peripheral surface of the base material obtained in the step (i) and baking to obtain an electro-conductive layer.

The step of obtaining the base material is not particularly limited. For example, it can be a base material having an endless belt shape or a roller shape. For example, a base material can be obtained by applying a resin material of the base material to the surface of a mold such as a cylindrical mold and heating as necessary.

Next, silver nanoparticle ink is applied to the outer peripheral surface of the obtained base material and baked (sintered) to form an electro-conductive layer. Although the temperature for baking is not particularly limited, it is preferably from 150° C. to 450° C., more preferably from 190° C. to 350° C. That is, the electro-conductive layer is preferably a baked body (sintered body) of silver nanoparticles. The baking time is also not particularly limited, and is, for example, from 10 min to 120 min.

As a result of studies by the present inventors, it was found that by applying silver nanoparticle ink to the outer peripheral surface of the base material and baking, the grain size of the silver crystal grains forming the electro-conductive layer and the volume resistivity of the electro-conductive layer are likely to be fit into a predetermined range.

The reason why it is possible to form an electro-conductive layer in which the grain size of the silver crystal grains and the volume resistivity of the electro-conductive layer are within a predetermined range by the above method is presumed as follows.

The silver nanoparticle ink consists of a metal component, which is silver with a primary particle size of about several tens of nanometers, and organic components such as an ink solvents and a dispersion stabilizer. When the silver nanoparticle ink is applied and baked, the organic components are decomposed and volatilized. As a result, the amount of impurities that hinder the conductive function of the electro-conductive layer is reduced, and the volume resistivity of the electro-conductive layer is lowered. However, since the volume resistivity is not smaller than that of the silver crystal itself, it can be kept within a predetermined range.

Meanwhile, by baking the applied silver nanoparticle ink, silver crystals grow, but since silver, which is the raw material of the ink, has a particle size of several tens of nanometers, it is easy to reduce the average crystal particle size to 200 nm or less. In addition, since baking does not reduce the size to or below the grain size of the raw material, the average crystal grain size of silver can easily be kept within a predetermined range by the above method.

According to one aspect of the present disclosure, a highly conductive and durable fixing rotating member and a method for manufacturing the same are provided. According to another aspect of the present disclosure, there is provided a fixing device using the fixing rotating member. According to yet another aspect of the present disclosure, an electro-photographic image forming apparatus using the fixing device is provided.

EXAMPLES

The present disclosure will be described in more detail hereinbelow using examples, but the present disclosure is not limited to these examples.

Example 1

The surface of a cylindrical stainless steel mold with an outer diameter of 30 mm was subjected to release treatment, and a commercially available polyimide precursor solution (U varnish S, manufactured by Ube Industries, Ltd.) was applied by a dipping method to form a coating film. Next, this coating film was dried at 140° C. for 30 min to volatilize the solvent in the coating film, and then baked at 200° C. for 30 min and at 400° C. for 30 min to imidize and form a polyimide film having a film thickness of 40 μm and a length of 300 mm.

Next, on this polyimide film, a ring-shaped pattern with a width of 300 μm and an interval of 200 μm was formed by an inkjet method using an ink containing silver nanoparticles (DNS163, manufactured by Daicel Corporation). After that, baking was performed at 200° C. for 30 min to form an electro-conductive layer **20*b*** with a maximum thickness of 2 μm.

Next, a PAI solution (VYLOMAX HR-16NN, manufactured by Toyobo Co., Ltd.) was applied to the entire surface of the electro-conductive layer **20*b* by ring coating, and then baked at 200° C. for 30 min to form a resin layer 20*e*** with a thickness of 40 μm.

Next, a primer (trade name: DY39-051A/B, manufactured by Dow Toray Industries, Inc.) was applied substantially uniformly to the outer peripheral surface of the resin layer **20*e*** so that the dry weight was 20 mg. Baking treatment was performed for 30 min in an electric furnace set to 160° C.

A silicone rubber composition layer having a thickness of 250 μm was formed on this primer by the ring coating method, and after primary crosslinking at 160° C. for 1 min, secondary crosslinking was performed at 200° C. for 30 min to form an elastic layer **20*c***.

The following silicone rubber composition was used.

As an organopolysiloxane having an alkenyl group and serving as component (a), a vinylated polydimethylsiloxane having at least two vinyl groups in one molecule (trade name: DMS-V41, manufactured by Gelest Co., Ltd., number-average molecular weight 68,000 (polystyrene equivalent), molar equivalent of vinyl group 0.04 mmol/g) was prepared.

In addition, as an organopolysiloxane having Si—H groups and serving as component (b), methyl hydrogen polysiloxane having at least two Si—H groups in one molecule (trade name: HMS-301, manufactured by Gelest Co., Ltd., number average molecular weight 1300, (polystyrene equivalent), molar equivalent of Si—H group 3.60 mmol/g) was prepared. A total of 0.5 parts by mass of component (b) was added to 100 parts by mass of component (a) and thoroughly mixed to obtain an addition curable silicone rubber raw liquid.

Further, a small amount of component (c) of addition curing reaction catalyst (platinum catalyst: platinum carbonylcyclovinylmethylsiloxane complex) and an inhibitor were added and thoroughly mixed.

With this addition-curable silicone rubber raw liquid, high-purity spherical alumina (trade name: ALNABEADS CB-A10S; manufactured by Showa Titanium Co., Ltd.) was blended and kneaded as a thermally conductive filler serving as component (d) in a volume ratio of 45% based on the elastic layer. After curing, an addition-curable silicone rubber composition having a JIS K 6253A-compliant durometer hardness of 10° was obtained.

Next, on the elastic layer **20*c* thus obtained, an addition-curable silicone rubber adhesive (trade name: SE1819CV A/B, manufactured by Dow Toray Industries, Inc.) for forming the adhesive layer 20*f* was substantially evenly applied to a thickness of approximately 20 μm. A fluororesin tube (trade name: NSE, manufactured by Gunze Ltd.) with an inner diameter of 29 mm and a thickness of 50 μm for forming the surface layer 20*d*** was layered on the adhesive layer while expanding diameter thereof.

After that, the excess adhesive was squeezed out from between the elastic layer **20*c* and the fluororesin tube to a thickness of about 5 μm by uniformly squeezing the belt surface from above the fluororesin tube. Next, a fixing rotating member was obtained by curing the adhesive by heating at 200° C. for 30 min, fixing the fluororesin tube on the elastic layer 20***c*, and finally cutting out both end portions to obtain a length of 240 mm.

Example 2

A fixing rotating member was produced in the same manner as in Example 1, except that the baking temperature of the electro-conductive layer 20*b* was set to 250° C.

Example 3

A fixing rotating member was produced in the same manner as in Example 1, except that the baking temperature of the electro-conductive layer 20*b* was set to 300° C.

Example 4

A fixing rotating member was produced in the same manner as in Example 1, except that a polyimide precursor solution (U varnish S, manufactured by Ube Industries, Ltd.) was used as the material of the resin layer 20*e* and was formed by drying at 140° C. for 30 min, baking at 200° C. for 30 min and imidizing at 400° C. for 30 min.

Example 5

A fixing rotating member was produced in the same manner as in Example 4, except that the baking temperature of the electro-conductive layer 20*b* was set to 250° C.

Example 6

A fixing rotating member was produced in the same manner as in Example 4, except that the baking temperature of the electro-conductive layer 20*b* was set to 300° C.

Comparative Example 1

A fixing rotating member was produced in the same manner as in Example 1, except that the electro-conductive layer 20*b* was formed by a plating method and a silver-plated conductive layer was used.

Specifically, a cylindrical polyimide film was prepared, and a ring-shaped masking material was placed on surface thereof. Subsequently, plating treatment was performed using a silver potassium cyanide bath as a silver plating bath. The pH of the plating bath was maintained between 8 and 9 and the temperature of the plating bath between 50° C. and 70° C. The masking material was removed after taking out from the plating bath and washing to obtain a base material on which an electro-conductive layer having a maximum thickness of 2 μm was formed.

Comparative Example 2

A fixing rotating member was produced in the same manner as in Example 4, except that the electro-conductive layer 20*b* was formed by a plating method and a silver-plated conductive layer was used.

Specifically, a cylindrical polyimide film was prepared, and a ring-shaped masking material was placed on surface thereof. Subsequently, plating treatment was performed using a silver potassium cyanide bath as a silver plating bath. The pH of the plating bath was maintained between 8 and 9 and the temperature of the plating bath between 50° C. and 70° C. The masking material was removed after taking out from the plating bath and washing to obtain a base material on which an electro-conductive layer having a maximum thickness of 2 μm was formed.

Evaluation: Member Durability Test

For Examples 1 to 6 and Comparative Examples 1 and 2, a repeated tensile test (dynamic viscoelasticity measuring device, manufactured by Hitachi High-Technologies Corporation) was performed, and the presence or absence of breakage of the electro-conductive layer after durability was evaluated by an electric current test. A sample cut out from the fixing rotating body so as to have a length of 5 mm and a width of 5 mm and 10 ring patterns of the electro-conductive layer was used and fixed to the device so as to be pulled in a direction coinciding with the circumferential direction of the rotating body.

A tensile test was performed 2 million times at a test temperature of 200° C., a strain amplitude of 3 μm (sine wave), and a stress frequency of 1 Hz. Volume resistivity was measured before and after durability, and a case A in which the variation range from the initial value was within ±2%, a case B in which the variation range exceeded ±2% and was within ±5% and a case C in which the variation range exceeded ±5% were considered. Table 1 shows the above results after durability.

Evaluation: Fixing Device Durability Test

For the fixing rotating members of Examples 1 to 6 and Comparative Examples 1 and 2, a paper passing durability test was conducted under the following conditions.

The fixing rotating members of Examples 1 to 6 and Comparative Examples 1 to 2 were incorporated into a fixing device, and the fixing device was mounted on a laser printer. The paper passing durability test for printing 2 million sheets without printing images was conducted in an atmosphere with an air temperature of 15° C. and a humidity of 10%, image printing was performed and image defects were checked for every 100,000 sheets.

A device based on Satera LBP961Ci (trade name, manufactured by Canon Marketing Japan) that was modified so that the pressure roller and the fixing rotating member could be rotated at a higher speed (linear velocity 400 mm/s) than usual was used for the laser printer. As the recording material P for evaluation, GF-0081 (A4 size 81.4 $g/m^2$, thickness 97 μm, manufactured by Canon Marketing Japan), which is a recording paper, was used.

The evaluation criteria were "A (good)" when no fixation defects due to breakage of the electro-conductive layer occurred when image printing was performed at the completion of printing of 2 million sheets, and "B (defective)" when fixation defects occurred.

Table 1 shows the physical properties (average crystal grain size, coefficient of variation of crystal grain size, volume resistivity, film thickness (maximum thickness), silver purity) and evaluation results of the electro-conductive layer of each example and comparative example.

TABLE 1

| | Heat generating layer | | Resin layer | | | | |
|---|---|---|---|---|---|---|---|
| | Metal layer | Baking temperature of heat generating layer ° C. | Resin type | Baking temperature of protective layer ° C. | Average crystal grain size nm | Coefficient of variation of crystal grain size — | Volume resistivity $\times 10^{-8}$ Ω · m |
| Example 1 | Silver nano-ink | 200 | PAI | 200 | 93 | 0.51 | 5.7 |
| Example 2 | Silver nano-ink | 250 | PAI | 200 | 109 | 0.49 | 4.7 |
| Example 3 | Silver nano-ink | 300 | PAI | 200 | 170 | 0.51 | 2.8 |
| Example 4 | Silver nano-ink | 200 | PI | 400 | 115 | 0.48 | 4.7 |
| Example 5 | Silver nano-ink | 250 | PI | 400 | 120 | 0.47 | 3.7 |
| Example 6 | Silver nano-ink | 300 | PI | 400 | 195 | 0.49 | 2.8 |
| Comparative Example 1 | Silver plating | — | PAI | 200 | 1600 | 0.30 | 2.1 |
| Comparative Example 2 | Silver plating | — | PI | 400 | 1800 | 0.21 | 2.0 |

| | | | Evaluation | | | |
|---|---|---|---|---|---|---|
| | | | Member durability test | | Actual device durability test | |
| | Film thickness µm | Silver purity mass % | Evaluation | Resistivity after durability | Evaluation | Detail |
| Example 1 | 2 | 99.5 | A | 5.8 | A | No image defects at and after 2 million sheets |
| Example 2 | 2 | 99.4 | A | 4.7 | A | No image defects at and after 2 million sheets |
| Example 3 | 2 | 99.7 | B | 3.0 | A | No image defects at and after 2 million sheets |
| Example 4 | 2 | 99.6 | A | 5.9 | A | No image defects at and after 2 million sheets |
| Example 5 | 2 | 99.5 | A | 4.6 | A | No image defects at and after 2 million sheets |
| Example 6 | 2 | 99.2 | B | 3.3 | A | No image defects at and after 2 million sheets |
| Comparative Example 1 | 2 | 99.8 | C | 8.8 | B | Locations with unfixed toner appeared at 1.5 million sheets |
| Comparative Example 2 | 2 | 99.8 | C | 9.8 | B | Locations with unfixed toner appeared at 1.2 million sheets |

The resistivity after durability is $\times 10^{-8}$ Ω·m.

From the results in Table 1, when comparing the examples and the comparative examples, samples with the average crystal grain size of the electro-conductive layer of 20*b* of from 20 nm to 200 nm show no breakage of the electro-conductive layer even after the member durability test. Therefore, it can be confirmed that the volume resistivity is small, no fixing defects occur even after the durability test in the actual device, and the durability is good.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-171565, filed Oct. 26, 2022, which is hereby incorporated by reference herein in its entirety.

What is claimed is:

1. A fixing device comprising:

a fixing rotating member; and an induction heating device that causes the fixing rotating member to generate heat by induction heating, wherein the fixing rotating member comprises a base material and an electro-conductive layer on the base material, wherein the electro-conductive layer comprises heat generating rings, which are electrically connected in a circumferential direction of an outer peripheral surface of the base material and electrically divided in a longitudinal direction, and which are aligned in the longitudinal direction, wherein the electro-conductive layer comprises silver, wherein an average crystal grain size of crystals of the silver observed in a cross section along a circumferential direction of the electro-conductive layer is 20 to 200 nm, wherein the electro-conductive layer has a volume resistivity of $1.0\times10^{-8}$ to $8.0\times10^{-8}$ Ω·m, and wherein the induction heating device comprises:

an excitation coil that is arranged inside the fixing rotating member and has a helical portion with a helical axis substantially parallel to a direction along a rotation axis of the fixing rotating member, the excitation coil serving to form an alternating magnetic field for causing the electro-conductive layer to generate heat by electromagnetic induction; and a magnetic core arranged in the helical portion and extending in the rotation axis direction so as not to form a loop outside the fixing rotating member, the magnetic core serving to guide lines of magnetic force of the alternating magnetic field, wherein the magnetic core is made of a ferromagnetic material, and wherein heat is mainly generated in the electro-conductive layer by an induced current induced by lines of magnetic force that exit from one longitudinal end of the magnetic core, pass outside the electro-conductive layer, and return to the other longitudinal end of the magnetic core.

2. The fixing device according to claim 1, wherein the fixing rotating member is a fixing belt having endless belt shape.

3. The fixing device according to claim 1, wherein the electro-conductive layer has a maximum thickness of 4 μm or less.

4. The fixing device according to claim 1, wherein a content of the silver in the electro-conductive layer is 99.0% by mass or more.

5. The fixing device according to claim 1, wherein the electro-conductive layer comprises a sintered body of silver nanoparticles.

6. The fixing device according to claim 1, wherein a coefficient of variation of the crystal grain size of the silver in the electro-conductive layer is less than 0.60.

7. The fixing device according to claim 1, wherein:

the fixing rotating member comprises a resin layer on a side of the electro-conductive layer opposite to a side facing the base material;

the base material contains a first heat-resistant resin; and the resin layer contains a second heat-resistant resin.

8. The fixing device according to claim 7, wherein the first heat-resistant resin is a polyimide or a polyamideimide, and wherein the second heat-resistant resin is a polyimide or a polyamideimide.

9. An electrophotographic image forming apparatus, the electrophotographic image forming apparatus comprising:

an image bearing member that bears a toner image;

a transfer device that transfers the toner image onto a recording material; and a fixing device that fixes the transferred toner image onto the recording material, wherein the fixing device comprises a fixing rotating member and an induction heating device that causes the fixing rotating member to generate heat by induction heating, wherein the fixing rotating member comprises a base material and an electro-conductive layer on the base material, wherein the electro-conductive layer comprises heat generating rings, which are electrically connected in a circumferential direction of an outer peripheral surface of the base material and electrically divided in a longitudinal direction, and which are aligned in the longitudinal direction, wherein the electro-conductive layer comprises silver, wherein an average crystal grain size of crystals of the silver observed in a cross section along a circumferential direction of the electro-conductive layer is 20 to 200 nm, and wherein the electro-conductive layer has a volume resistivity of $1.0\times10^{-8}$ to $8.0\times10^{-8}$ Ω·m.

* * * * *